(12) United States Patent
de Lamberterie et al.

(10) Patent No.: US 9,714,748 B2
(45) Date of Patent: Jul. 25, 2017

(54) OPTICAL UNIT, IN PARTICULAR FOR A MOTOR VEHICLE

(75) Inventors: Antoine de Lamberterie, Paris (FR); Christophe Dubosc, Villemomble (FR)

(73) Assignee: Valeo Vision, Bobigny (FR)

( * ) Notice: Subject to any disclaimer, the term of this patent is extended or adjusted under 35 U.S.C. 154(b) by 630 days.

(21) Appl. No.: 14/240,113

(22) PCT Filed: Sep. 13, 2012

(86) PCT No.: PCT/EP2012/067897
§ 371 (c)(1),
(2), (4) Date: Jun. 4, 2014

(87) PCT Pub. No.: WO2013/037861
PCT Pub. Date: Mar. 21, 2013

(65) Prior Publication Data
US 2014/0328075 A1    Nov. 6, 2014

(30) Foreign Application Priority Data

Sep. 13, 2011   (FR) ...................................... 11 58116

(51) Int. Cl.

| | | |
|---|---|---|
| *B60Q 1/00* | (2006.01) | |
| *F21S 8/10* | (2006.01) | |
| *F21V 5/04* | (2006.01) | |
| *F21V 5/08* | (2006.01) | |
| *G02B 3/10* | (2006.01) | |
| *F21W 101/00* | (2006.01) | |
| *F21W 111/00* | (2006.01) | |
| *F21Y 115/10* | (2016.01) | |

(52) U.S. Cl.
CPC ............. *F21S 48/22* (2013.01); *F21S 48/215* (2013.01); *F21V 5/04* (2013.01); *F21V 5/08* (2013.01); *G02B 3/10* (2013.01); *F21W 2101/00* (2013.01); *F21W 2111/00* (2013.01); *F21Y 2115/10* (2016.08)

(58) Field of Classification Search
CPC  F21S 48/22; F21S 48/215; F21V 5/04; F21V 5/08; G02B 3/10; F21W 2101/00; F21W 2111/00; F21Y 2101/02
USPC ... 362/487, 235, 509, 511, 545, 257, 311.02
See application file for complete search history.

(56) References Cited

U.S. PATENT DOCUMENTS

| 7,800,840 B2 | 9/2010 | Shyu et al. | |
|---|---|---|---|
| 2002/0034081 A1* | 3/2002 | Serizawa | F21S 48/215 362/540 |

(Continued)

FOREIGN PATENT DOCUMENTS

| FR | 2814219 | 3/2002 |
|---|---|---|
| FR | 2947325 | 12/2010 |

*Primary Examiner* — Andrew Coughlin
*Assistant Examiner* — Jessica M Apenteng
(74) *Attorney, Agent, or Firm* — Jacox, Meckstroth & Jenkins

(57) ABSTRACT

An optical unit, in particular for an optical module, comprising:
  at least one first and one second mutually distant luminous sources,
  at least one convergent multifocal lens, comprising at least one undulated face, the undulated face comprising at least three distinct portions, two of these portions being focused substantially on the first luminous source and the other portion being positioned between these two portions and being focused substantially on the second luminous source.

17 Claims, 5 Drawing Sheets

(56) References Cited

U.S. PATENT DOCUMENTS

2010/0061105 A1    3/2010   Shyu et al.
2011/0007518 A1    1/2011   de Lamberterie \* cited by examiner

OPTICAL UNIT, IN PARTICULAR FOR A MOTOR VEHICLE

CROSS-REFERENCE TO RELATED APPLICATIONS

This application claims priority to PCT Application PCT/EP2012/067897 filed Sep. 13, 2012, and also to French Application No. 1158116 filed Sep. 13, 2011, which are incorporated herein by reference and made a part hereof.

FIELD OF THE INVENTION

The invention relates in particular to an optical unit, in particular for an automotive vehicle.

DESCRIPTION OF THE RELATED ART

In the field of the automobile industry, the signaling and lighting functions, such as a daytime light (also called Daytime Running Light or DRL) or a direction indicator, are achieved separately by distinct optical modules.

For reasons of bulk and visual appearance, in the prior art there exist solutions making it possible to obtain a single optical module achieving two distinct photometric functions, viz, lighting and/or signaling.

Document FR-A-2 947 325, which is equivalent to U.S. Patent Publication 2011/0007518, discloses an optical device endowed with at least two luminous sources each achieving a function, and with a light guide having a common exit face for the light rays issuing from the two sources.

Such a light guide requires a coupling system for the luminous sources which, in addition to the extra bulk and the difficulty of production, exhibits the drawback of inducing significant photometric losses.

A need therefore exists to produce an optical unit which, while remaining compact and simple, makes it possible to achieve two photometric functions.

SUMMARY OF THE INVENTION

The invention is aimed in particular at addressing the aforementioned need.

The subject of the invention is thus an optical unit, in particular for an optical module, comprising:

at least one first and one second mutually distant luminous sources, at least one convergent multifocal lens, comprising at least one undulated face, the undulated face comprising at least three distinct portions, two of these portions being focused substantially on the first luminous source and the other portion being positioned between these two portions and being focused substantially on the second luminous source.

By virtue of the invention, an optical unit capable of producing two different photometric functions and which exhibits low bulk can be produced in a simple manner.

In an exemplary implementation of the invention, the portions are mutually adjoining pairwise.

If appropriate, the portions can be adjoining by at least one part of their outline.

If so desired, the portions together cover just a part of the undulated face.

Preferably, the portions together cover the whole of the undulated face.

Advantageously, each portion extends over the whole of the height of the undulated face.

This characteristic allows the advantage of laterally spreading that is to say in the width direction of the undulated face, the luminous power of the light passing through the undulated face.

The terms width and lateral are understood as parallel to an axis contained in the plane containing the emission axes of the luminous sources and perpendicular to the emission axes.

The terms height and vertical are understood as parallel to an axis perpendicular to the plane containing the emission axes of the luminous sources.

In an exemplary preferred implementation of the invention, the undulated face comprises striations, these striations being formed by two successive portions, these two successive portions exhibiting mutually differing focusings.

If appropriate, the two portions of a striation can be adjoining at the top of the striation.

The curve containing the tops of each striation of the undulated face is called a carrier.

Advantageously, the striations are arranged pseudo-periodically or periodically the whole way along the undulated face.

For example, the striations are arranged periodically, the whole way along a carrier of the undulated face.

Thus, the portions focused on the first luminous source are alternated with the portions focused on the second luminous source.

In an exemplary implementation of the invention, the dimensions of two portions of a striation are substantially identical.

In particular, the dimensions of all the portions of the undulated face are substantially identical.

This characteristic offers the advantage of being able to produce, on the basis of the first luminous source, a light beam whose intensity on the axis of the beam is substantially identical to that of a light beam produced by the second luminous source.

As a variant, the dimensions of the portions focused on one of the luminous sources are substantially different from the dimensions of the portions focused on the other of the luminous sources.

For example, the dimensions of the portions focused on the first luminous source are substantially equal to double the dimensions of the portions focused on the second luminous source.

The light beam produced by the unit on the basis of the first luminous source therefore exhibits a luminous intensity on the axis of the beam that is twice as large as that of the light beam produced by the unit on the basis of the second luminous source.

In an exemplary implementation of the invention, the undulated face is globally concave.

As a variant, the undulated face is formed by sweeping a so-called generating curve along a director curve.

For example, the undulated face is cylindrical and exhibits a straight generating line and a director curve.

If appropriate, the director of the undulated face can be continuous and differentiable over the whole of its length, in particular does not exhibit any cusp, jump or kink point.

For example, the director of the undulated face is an undulated curve, that is to say a curve exhibiting undulations, for example an alternately concave and convex curve.

If so desired, the amplitude of an undulation of the director is dependent on the distance of this undulation from one of the luminous sources, in particular the luminous source closest to this undulation.

The carrier of the undulated face thus represents the set of amplitudes of the undulations of the director.

It is thus possible to control the spread of the luminous intensity of the light beam produced by this luminous source by modifying the profile of this carrier.

The carrier can exhibit a circular arc shape.

As a variant, the carrier can exhibit an elliptic arc shape.

Preferably, the carrier can exhibit a hyperbolic arc shape.

In particular, the amplitude of the undulations of the director decreases steadily as the undulations get further away from the luminous sources.

As a variant, the amplitude of the undulations of the director is globally constant.

In an exemplary embodiment of the invention, the director of the undulated face is globally curved.

As a variant, the director of the undulated face is globally rectilinear.

Advantageously, the luminous sources each exhibit an emission axis and the director of the undulated face is contained in a plane parallel to the plane defined by these emission axes.

The term focusing point of a portion hereinafter is understood for any point of space from which a light ray is emitted, reaches this portion of the lens and is refracted by the lens parallel to a predetermined optical axis of the lens.

A portion therefore exhibits a plurality of focusing points distributed in space, for example as focal line or as focusing zone.

In an exemplary implementation of the invention, at least one of the portions of the lens is focused predominantly on one of the luminous sources.

That is to say at least 50% of the focusing points of this portion are positioned on the surface of this luminous source.

Stated otherwise, certain focusing points of this portion are positioned outside the surface of this luminous source.

This characteristic allows the advantage of laterally spreading the luminous power of the light emitted by this luminous source and passing through this portion and thus of rendering the light beam produced by the optical unit laterally homogeneous.

It is also thus possible to increase the lateral range of the light beam produced by the optical unit so as, for example when the unit is mounted in an automotive vehicle, to increase the zone of perceptibility of this light beam by an observer placed outside the vehicle.

Preferably, the entirety of the portions of the lens focused on one of the luminous sources is focused predominantly on this luminous source.

In an exemplary implementation of the invention, the at least one of the portions focused predominantly on one of the luminous sources is not focused on the other of the luminous sources.

That is to say none of the focusing points of this portion is positioned on the other luminous source.

Preferably, the entirety of the portions focused predominantly on one of the luminous sources is not focused on the other of the luminous sources.

Advantageously, the at least one of the portions is focused symmetrically around the center of one of the luminous sources.

That is to say the set of focusing points of this portion is positioned symmetrically around the center of this luminous source.

Preferably, the entirety of the portions focused on one of the luminous sources is focused symmetrically around the center of this luminous source.

In another exemplary implementation of the invention, at least one of the portions of the lens is focused on one of the luminous sources only.

That is to say the entirety of the focusing points of this portion is positioned on this luminous source.

This characteristic offers the advantage of concentrating almost the entirety of the luminous power of the light emitted by this luminous source and passing through this portion in the direction of the optical axis of the lens and thus of optimizing the luminous power of the light beam produced by the unit.

Preferably, the entirety of the portions of the lens focused on one of the luminous sources is focused only on this luminous source.

In an exemplary implementation of the invention, the undulated face is an entry face for ingress of the light emitted by the luminous sources into the lens.

As a variant, the undulated face is an exit face for egress of the light emitted by the luminous sources into the lens.

In an exemplary implementation of the invention, the lens comprises a second face, the second face being an undulated face such as described hereinabove.

As a variant, the lens comprises a second face, this second face is formed by sweeping a so-called generating curve along a director curve.

For example, this second face is cylindrical and exhibits a straight generating line and a director curve.

If appropriate, the director of the second face can be contained in a plane perpendicular to the plane defined by the emission axes of the luminous sources.

This characteristic offers the advantage of being able to distribute the luminous power of the light emitted by a luminous source and passing through the lens on the one hand laterally by virtue of the first face and vertically by virtue of the second face.

As a further variant, the lens comprises a second face, this second face being concave.

In an exemplary implementation of the invention, the first and second luminous sources each comprise a photoemissive element of a different light-emitting diode.

In another exemplary implementation of the invention, the first and second luminous sources comprise a photoemissive element of one and the same light-emitting diode.

Advantageously, the first luminous source is capable of emitting white colored light.

If appropriate, the second luminous source can be capable of emitting amber colored light.

The invention also relates to an optical module, in particular for a lighting and/or signaling device, comprising at least one optical unit such as described hereinabove.

In an exemplary embodiment of the invention, the module comprises at least two optical units, the exit faces for egress of the light from the optical units being adjoining pairwise.

If so desired, the two optical units are made as a single material component.

If appropriate, the junctions between the light exit faces are arranged in such a way that together, the exit faces for egress of the light from the optical units exhibit a continuous appearance.

The visual appearance of the optical module, when it is mounted in a vehicle, such as can be appreciated by an observer placed outside the vehicle is thus improved.

Advantageously, the optical module is capable of creating a first light beam on the basis of the light rays emitted by the first luminous sources, this first beam achieving at least one part of a first predetermined regulatory photometric function, in particular the entirety of a first predetermined photometric function.

For example, this first regulatory photometric function is a daytime light, also called DRL.

If so desired, the module is capable of creating a second light beam on the basis of the light rays emitted by the second luminous sources, this second beam achieving at least one part of a second predetermined regulatory photometric function, in particular the entirety of a second predetermined photometric function.

For example, this second regulatory photometric function is a direction indicator.

The optical module is consequently capable of producing two photometric functions: a daytime light and a direction indicator.

The invention also relates to a lighting and/or signaling device, in particular for an automotive vehicle, comprising at least one module such as described hereinabove.

In an exemplary embodiment of the invention, the device comprises an electrical power supply device for the first and second luminous sources of the modules.

If appropriate, the electrical power supply device may be capable of supplying solely either the first luminous sources or the second luminous sources according to the desired photometric function.

For example, the power supply for the lone first luminous sources corresponds to the emission of a 'daytime light' function, and the power supply for the lone second luminous sources corresponds to the emission of a 'direction indicator' function.

The invention also relates to a convergent multifocal lens, in particular for an optical unit such as described hereinabove, this lens comprising at least one undulated face, the undulated face comprising at least three distinct portions, two of these portions being focused on a first zone and the other portion being positioned between these two portions and being focused substantially on a second zone, the first and second zones being distinct or overlapping only partially.

BRIEF DESCRIPTION OF THE ACCOMPANYING DRAWINGS

The invention will be better understood on reading the detailed description which follows, of nonlimiting examples of implementation of the invention, and on examining the appended drawing in which.

DETAILED DESCRIPTION OF THE PREFERRED EMBODIMENTS

Figure 1:
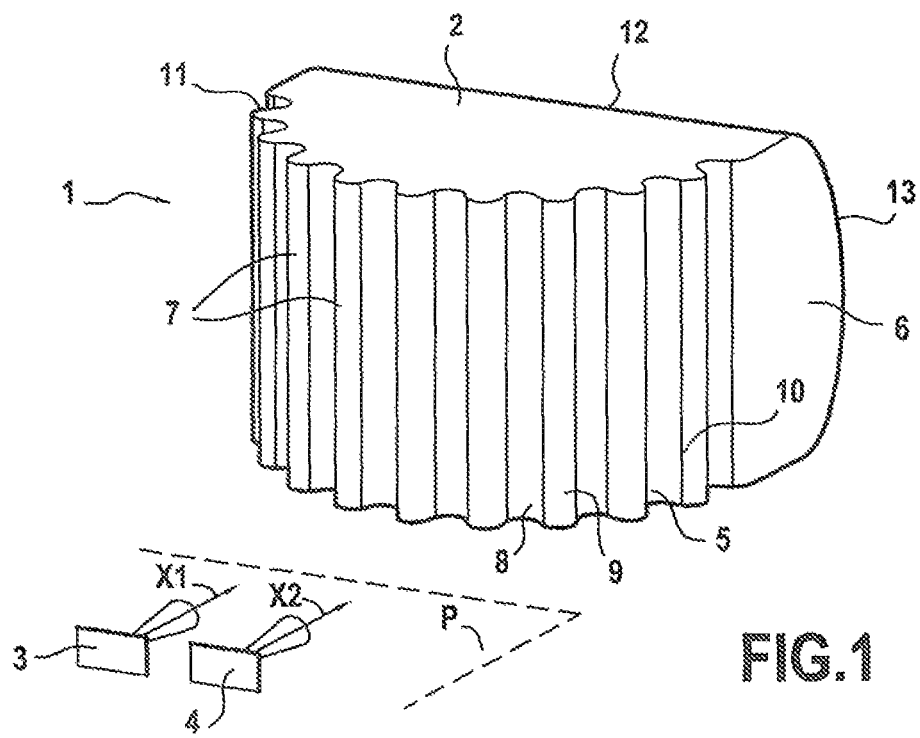
FIG. 1 illustrates, schematically and partially, in a view from behind, an optical unit according to an exemplary implementation of the invention.

Represented in FIG. 1 is an optical unit 1 comprising a lens 2 and two light-emitting diodes 3 and 4 mounted respectively on their electronic card.

The lens 2 comprises an undulated entry face 5 for the light and an exit face 6 for the light.

The undulated entry face 5 is cylindrical and exhibits a straight generating line 10 and a director curve 11.

The director curve 11 is an undulated curve contained in a plane parallel to the plane P containing the respective emission axes X1 and X2 of the light-emitting diodes 3 and 4.

The director curve 11 is globally curved.

The amplitudes of the undulations of the director curve 11 decrease steadily as these undulations get further away from the diodes 3 and 4.

The undulated entry face 5 comprises a plurality of striations 7 whose profile corresponds to the director curve 11.

The striations 7 overlap the entirety of the undulated entry face 5, these striations 7 being arranged periodically the whole way along the undulated entry face 5.

The striations 7 extend over the whole of the height of the undulated entry face 5.

Each striation 7 comprises two portions 8 and 9, these portions meeting at the top of the striation.

This top is illustrated on two striations as dashed lines (FIG. 2) between the portions 8 and 9. For the sake of clarity, it has been represented on only two striations.

Consequently, the portions 8 alternate with the portions 9 the whole way along the undulated entry face 5.

The portions 8 are focused on the light-emitting diode 3 and the portions 9 are focused on the light-emitting diode 4.

The exit face 6 is cylindrical and exhibits a straight generating line 12 and a director curve 13.

The director curve 13 of the exit face 6 is contained in a plane perpendicular to the plane P.

The light-emitting diodes 3 and 4 emit in the direction of the lens 2 respectively white colored light and amber colored light.

Figure 2:
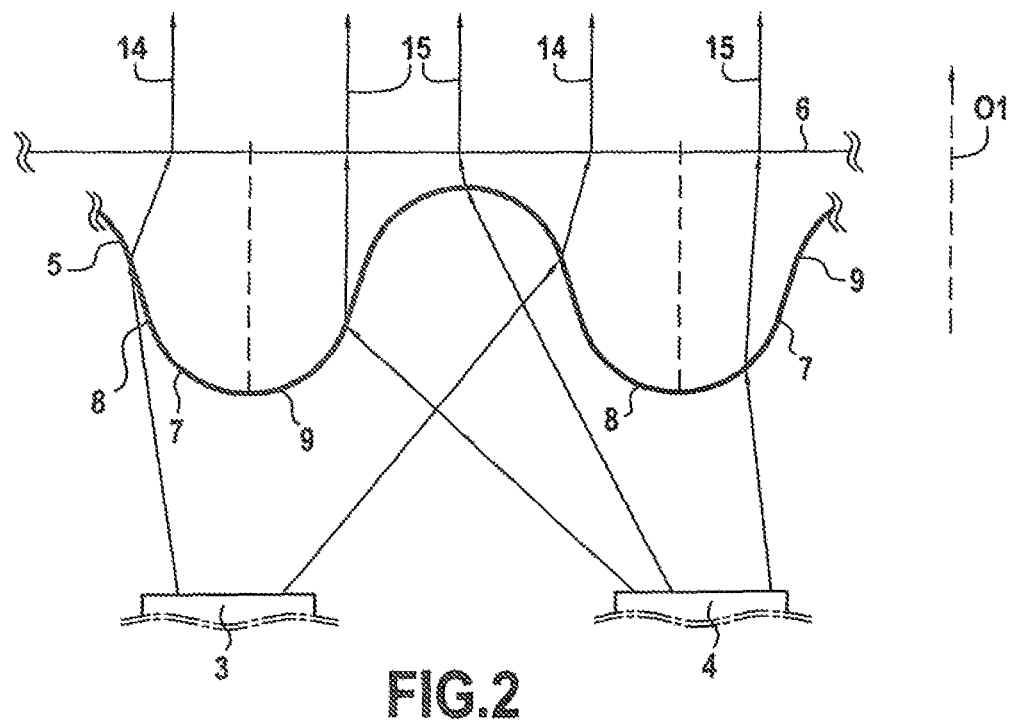
FIG. 2 represents, schematically and partially, a cross-section of the optical unit of FIG. 1.

Represented in FIG. 2 is a part of a cross-section through a plane parallel to the plane P of the lens 2 of FIG. 1.

The lens 2 exhibits an undulated entry face 5 exhibiting striations 7, an exit face 6 for the light and an optical axis O1.

The striations 7 each comprise two portions 8 and 9 meeting at the top of the striation.

The portions 8 are focused on the light-emitting diode 3 and the portions 9 are focused on the light-emitting diode 4.

Light rays 14 of white color emitted by the diode 3 in the direction of the lens 2 reach one of the portions 8 of the striations 7 and are refracted successively by these portions 8 and then parallel to the optical axis O1 by the exit face 6.

The light beam produced by the optical unit 1 on the basis of these rays 14 achieves a part of a daytime light.

Light rays 15 of amber color emitted by the diode 4 in the direction of the lens 2 reach one of the portions 9 of the striations 7 and are refracted successively by these portions 9 and then parallel to the optical axis O1 by the exit face 6.

The light beam produced by the optical unit 1 on the basis of these rays 15 achieves a part of a direction indicator.

The optical unit 1 is therefore capable of producing two beams exhibiting a different photometry but according to one and the same optical axis on the basis of two distinct light sources.

Represented in FIGS. 3 to 6 are other portions of the lens 2 of FIG. 1 according to various examples of implementation of the invention.

Figure 3:
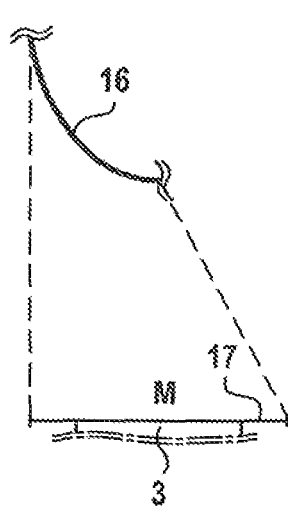
FIGS. 3 to 6 represent, schematically and partially, a cross-section of an optical unit according to various examples of implementation of the invention.

In FIG. 3, a portion 16 focused predominantly on the light-emitting diode 3 has been represented.

That is to say at least 50% of the focusing zone 17, representing the set of focusing points of the portion 16, is positioned on the light-emitting diode 3.

Moreover, the portion 16 is focused symmetrically around the center of the light-emitting diode 3.

That is to say the focusing zone or portion 16 extends symmetrically on either side of the center M of the diode 3.

Figure 4:
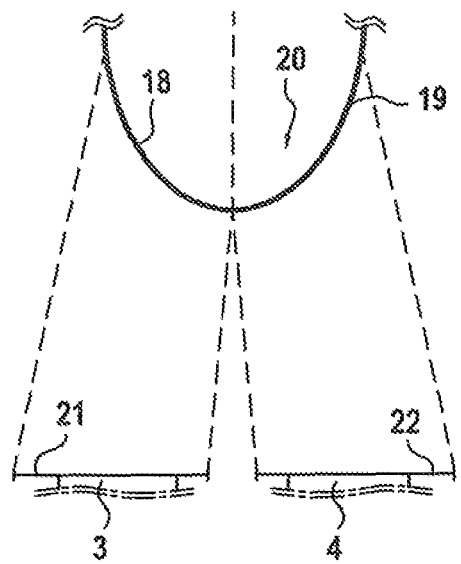

In FIG. 4, two portions 18 and 19 forming a striation 20 have been represented.

The portion 18 is focused predominantly on the light-emitting diode 3 without being focused on the light-emitting diode 4.

The portion 19 is focused predominantly on the light-emitting diode 4 without being focused on the light-emitting diode 3.

Thus, the focusing zone 21 of the portion 18 is distant from the light-emitting diode 4 while the focusing zone 22 of the portion 19 is distant from the light-emitting diode 3.

Figure 5:
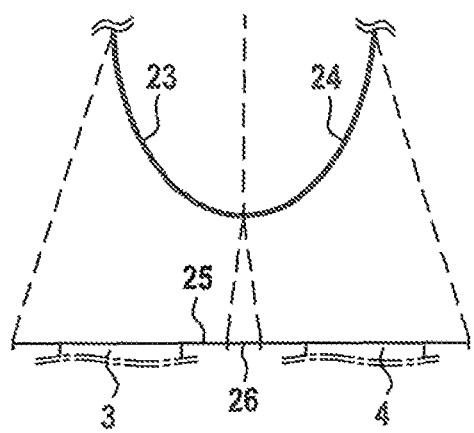

Represented in FIG. 5 are two portions 23 and 24 similar to the portions 18 and 19 of FIG. 4 with the exception of the fact that the respective focusing zones 25 and 26 of the portions 23 and 24 overlap one another.

Figure 6:
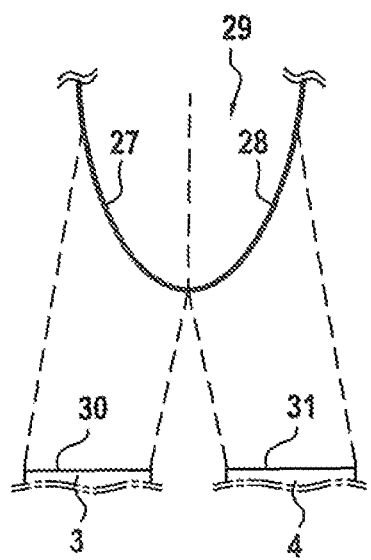

Two portions 27 and 28 of a striation 29 have been represented in FIG. 6.

The focusing zone 30 of the portion 27 is focused only on the light-emitting diode 3.

The focusing zone 31 of the portion 28 is focused only on the light-emitting diode 4.

Thus, the entirety of the focusing points forming the zones or portions 27 and 28 are respectively positioned on the light-emitting diodes 3 and 4.

Represented in FIGS. 7A-9B are two cross-sections of a lens 32 respectively through a plane P parallel to the plane containing the emission axes of the luminous sources and through a plane P' perpendicular to P according to three exemplary embodiments.

Figure 7A:
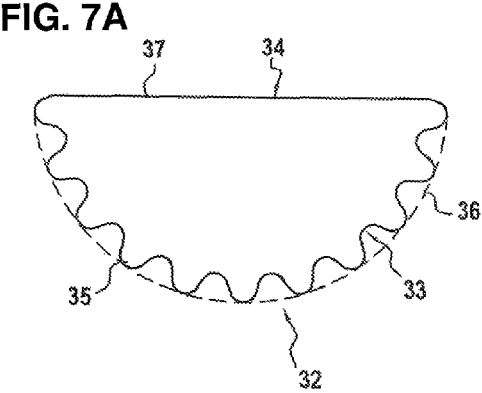
FIGS. 7A-9B represent, schematically and partially, a cross-section of an optical unit according to various examples of implementation of the invention.
Figure 7B:
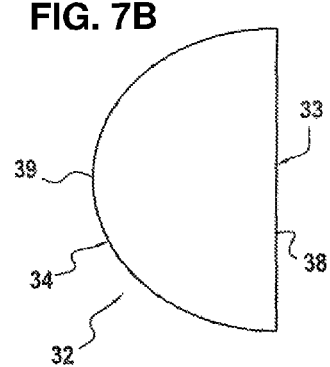

In FIGS. 7A-7B, the lens 32 comprises an undulated entry face 33 for the light and an exit face 34 for the light.

The undulated entry face 33 is cylindrical and is formed by the extrusion of a straight generating line 38 along a so-called director curve 35.

The director curve 35 of the undulated entry face 33 exhibits a globally circular arc-like shape. The director curve 35 comprises undulations whose amplitude is determined by a carrier 36.

The undulations of the director curve 35 form the profile of the striations of the lens 32 when the straight generating line 38 is translated along this director curve 35.

The exit face 34 for the light is also cylindrical and is formed by the extrusion of a straight generating line 37 along a director curve 39.

The director curve 39 of the exit face 34 is an elliptic arc portion devoid of undulation so as to form an exit face 34 exhibiting a smooth profile.

Figure 8A:
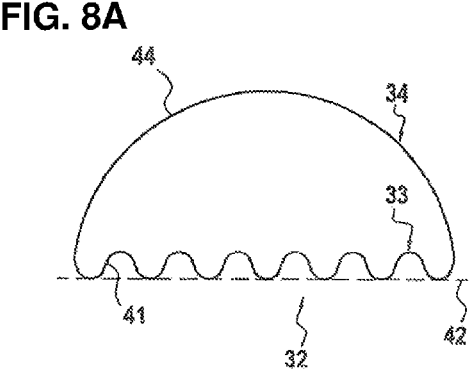
Figure 8B:
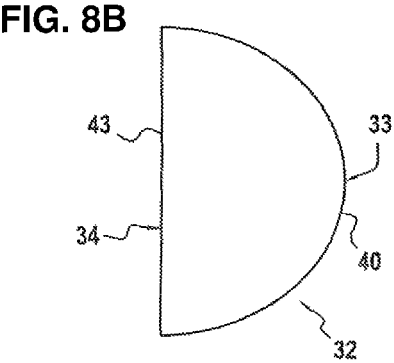

In FIGS. 8A-8B, the lens 32 comprises an undulated entry face 33 for the light and an exit face 34 for the light 34.

The undulated entry face 33 is formed by sweeping a generating curve 40 along a director curve 41.

The director curve 41 of the undulated entry face 33 is a globally curved undulated curve.

The amplitude of the undulations of the director curve 41 is constant and is determined by a carrier 42.

The generator 40 of the undulated entry face 33 is a portion of circle devoid of undulation.

The exit face 34 for the light is cylindrical and is formed by the extrusion of a straight generating line 43 along a director curve 44.

The director curve 44 of the exit face 34 is a portion of ellipse devoid of undulation.

Figure 9A:
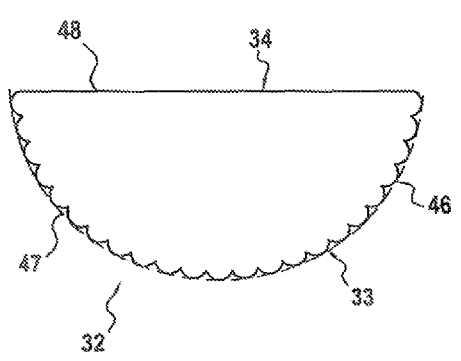
Figure 9B:
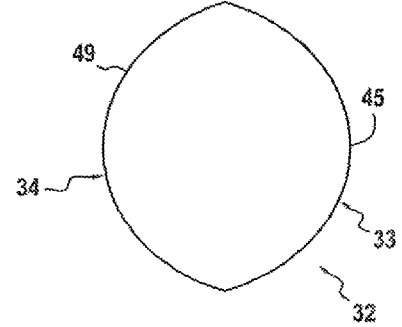

In FIGS. 9A-9B, the lens 32 comprises an undulated entry face 33 for the light and an exit face 34 for the light.

The undulated entry face 33 is formed by sweeping a generating curve 45 along a director curve 46.

The director curve 46 of the undulated entry face 33 is a globally curved undulated curve.

The amplitude of the undulations of the director curve 46 is determined by a carrier 47, these undulations meeting at cusp points.

The generator 45 is a smooth ellipse portion.

The exit face 34 for the light is cylindrical and is formed by the extrusion of a straight generating line 48 along a director curve 49.

The director curve 49 is a portion of ellipse devoid of undulation.

Figure 10:
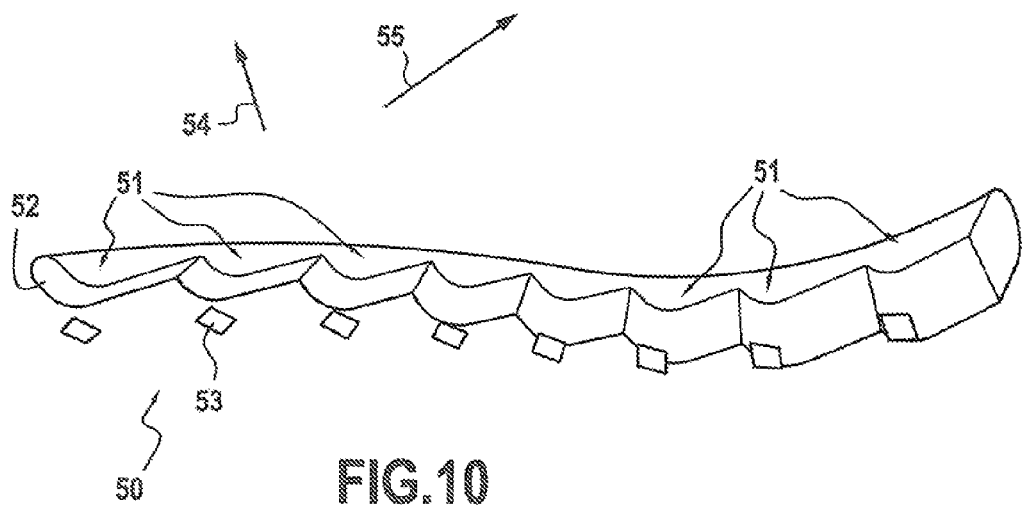
FIGS. 10 and 11 represent, schematically and partially, respectively in a view from behind and in an end-on view, an optical module according to an exemplary implementation of the invention using several optical units.
Figure 11:
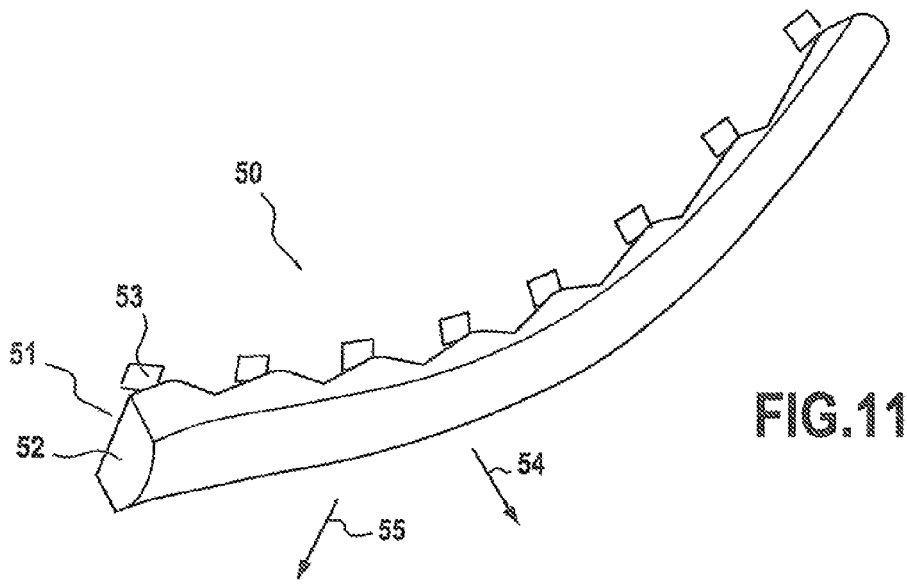

An optical module 50 according to one embodiment of the invention has been represented in FIGS. 10 and 11, in an end-on view and a view from behind.

This optical module 50 comprises eight optical units 51.

These optical units 51 each comprise a lens 52, such as described in FIG. 1, and two photoemissive elements of one and the same light-emitting diode 53, the lenses 52 being focused alternately on these two photoemissive elements.

The set of exit faces of the lenses 52 exhibits a continuous and smooth visual appearance.

The optical module 50 is capable of emitting, in the direction 54, a daytime light, and in the direction 55, a direction indicator.

Figure 12:
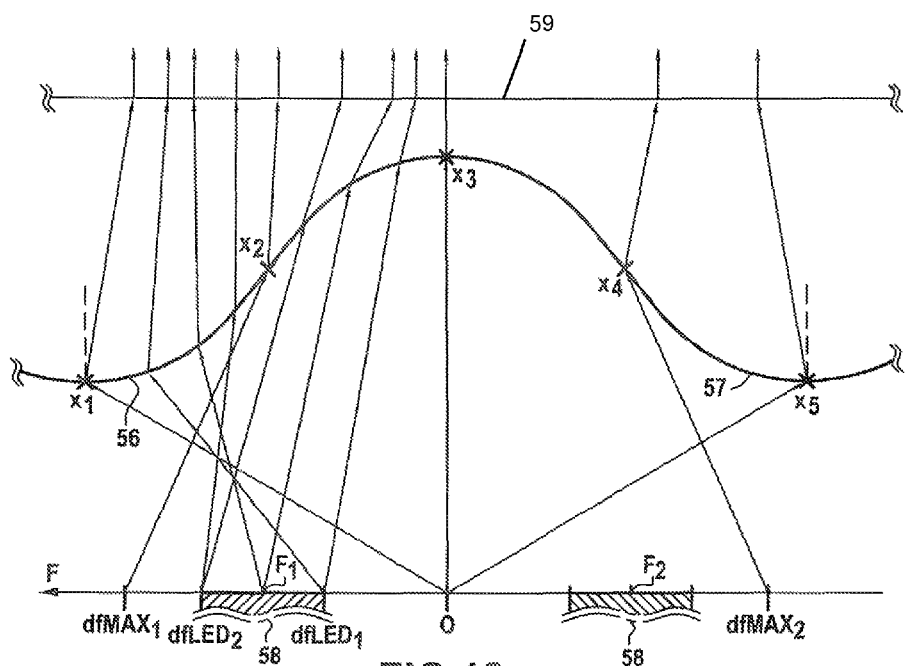
FIGS. 12 and 13 represent, schematically and partially, an example of the evolution of the focusing points of the undulated face along the director of the lens.

A part of a cross-section in a plane P of the optical unit of FIG. 1 has been represented in FIG. 12. Observed, in this FIG. 12, are two portions 56 and 57 of the undulated light entry face of the lens, an exit face 59 for the light and two luminous sources 58.

The portion 56 corresponds to the slope of a first striation and the portion 57 corresponds to the slope of a second striation, these two striations meeting at a point with abscissa x3.

The portion 56 extends between the top of the first striation with abscissa x1 and the point with abscissa x3.

The portion 56 exhibits a point of inflection with abscissa x2.

The portion 57 extends between the top of the second striation with abscissa x5 and the point with abscissa x3.

The portion 57 exhibits a point of inflection with abscissa x4.

Figure 13:
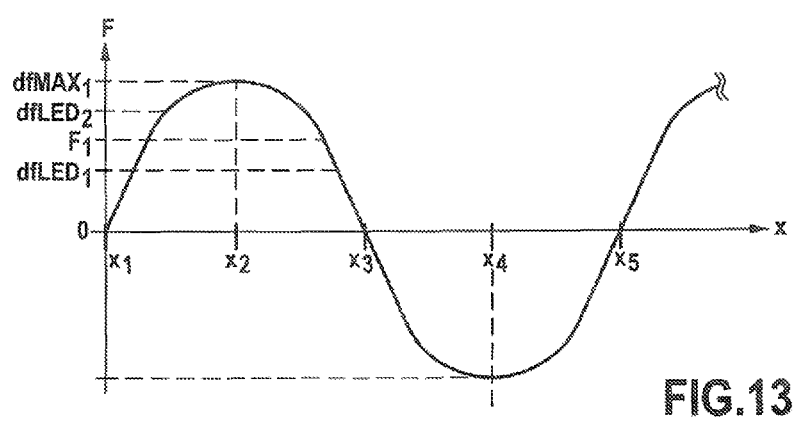

Represented in FIG. 13 is the curve of the positioning of focusing points, that is to say the points from which a light ray would be emitted and would be refracted, parallel to the optical axis of the lens, by the lens, portions 56 and 57 on an axis F passing through the centers F1 and F2 of the luminous sources 58, as a function of the position of a point M along the portions 56 and 57, more particularly as a function of the abscissa x of this point M.

As illustrated in FIGS. 12 and 13, the focusing point of the point x1 is situated between the two light sources 58, at the point with abscissa O on the axis F.

When the point M progresses over the portion 56 from the point x1 to the point x2, the focusing point progresses from the point O to the point dFMAX1.

So doing, it successively encounters a first edge dFLED1 of the source 58 with center F1, the center F1 of the source and a second edge dFLED2 of the source 58 with center F1.

When the point M progresses from the point x2 to the point x3, the focusing point progresses from the point dFMAX1 to the point O.

So doing, it successively encounters the second edge dFLED2 of the source 58 with center F1, the center F1 of the source and the first edge dFLED1 of the source 58 with center F1.

When the point M passes beyond the point x3, this point M progresses over the portion 57 and the focusing is done around the source 58 with center F2.

When the point M progresses over the portion 57 from the point x3 to the point x4, the focusing point progresses from the point O to the point dFMAX2.

When the point M progresses over the portion 57 from the point x4 to the point x5, the focusing point progresses from the point dfMAX2 to the point O.

When the point M passes beyond the point x5, this point M progresses over the following portion and the focusing is done around the source 58 with center F1, in the same manner as described above for the portion 56.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. An optical unit for an optical module, comprising:
   at least one first and one second mutually distant luminous sources,
   at least one convergent multifocal lens, comprising at least one undulated face, said at least one undulated face comprising at least three distinct portions, a first portion and a second portion being substantially focused on said at least one first luminous source and a third portion being positioned between said first portion and said second portion and being focused substantially on said second mutually distant luminous source;
   wherein said at least one undulated face is formed by sweeping a generating curve along a director curve;
   wherein said luminous sources each exhibit an emission axis (X1,X2) and said director curve of said at least one undulated face is contained in a plane generally parallel to a plane (P) defined by said emission axes (X1,X2).

2. The optical unit as claimed in claim 1, wherein said at least three distinct portions are mutually adjoining pairwise by at least one part of their outline.

3. The optical unit as claimed in claim 1, wherein said at least three distinct portions together cover the whole of said at least one undulated face.

4. The optical unit as claimed in claim 1, wherein said first and second portions focused on said at least one first luminous source are alternated with said third portion focused on said second mutually distant luminous source.

5. The optical unit as claimed in claim 1, wherein said at least one undulated face is an entry face for the light emitted by said luminous sources in said lens.

6. The optical unit as claimed in claim 1, wherein said lens comprises a second face, said second face being formed by sweeping a generating curve along a director curve.

7. The optical unit as claimed in claim 6, wherein said director curve of said second face is contained in a plane perpendicular to a plane (P) defined by the emission axes of the luminous sources.

8. An optical module for a lighting and/or signaling device, comprising at least one optical unit as claimed in claim 1.

9. The optical module as claimed in claim 8, wherein said optical module comprises at least two optical units, exit faces for egress of the light from said optical units being adjoining pairwise.

10. The optical module as claimed in claim 8 wherein together, exit faces for egress of the light from said optical units exhibit a continuous appearance.

11. The optical module as claimed in claim 8, wherein said optical module is capable of creating a first light beam on the basis of the light rays emitted by said at least one first luminous sources, said first light beam achieving at least one part of a first predetermined regulatory photometric function.

12. The optical module as claimed in claim 11, wherein said optical module is capable of creating a first light beam on the basis of the light rays emitted by said at least one first luminous sources, said first light beam achieving the entirety of a first predetermined regulatory photometric function.

13. The optical module as claimed in claim 11, wherein said optical module is capable of creating a second light beam on the basis of the light rays emitted by said at least one second mutually distant luminous sources, said second light beam achieving at least one part of a second predetermined regulatory photometric function.

14. The optical module as claimed in claim 13, wherein said optical module is capable of creating a second light beam on the basis of the light rays emitted by said at least one second mutually distant luminous sources, said second light beam achieving the entirety of a second predetermined regulatory photometric function.

15. A lighting and/or signaling device for an automotive vehicle, comprising at least one optical module as claimed in claim 8.

16. The optical module as claimed in claim 8 wherein together, exit faces for egress of the light from said optical units exhibit a continuous appearance.

17. A convergent multifocal lens for an optical unit as claimed in claim 1, wherein said optical unit comprises at least one undulated face, said at least one undulated face comprising at least three distinct portions, said at least three distinct portions comprising a first portion and a second portion focused on a first focusing zone and a third portion positioned between said first portion and said second portion and being focused substantially on a second focusing zone, said first and second focusing zones being distinct or overlapping only partially.

* * * * *